Dec. 19, 1967     L. BJÖRK     3,359,481
MEANS FOR DERIVING A CONTROL FUNCTION VOLTAGE FOR CONVERTERS
Filed July 23, 1964     4 Sheets-Sheet 1

INVENTOR.
LENNART BJÖRK
BY
Bailey, Stephens + Huettig

Dec. 19, 1967     L. BJÖRK     3,359,481
MEANS FOR DERIVING A CONTROL FUNCTION VOLTAGE FOR CONVERTERS
Filed July 23, 1964     4 Sheets-Sheet 4
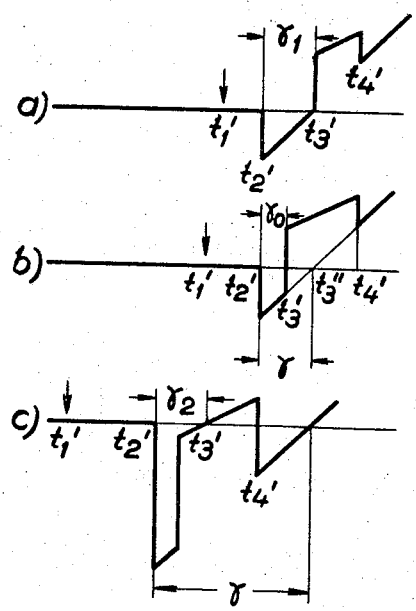
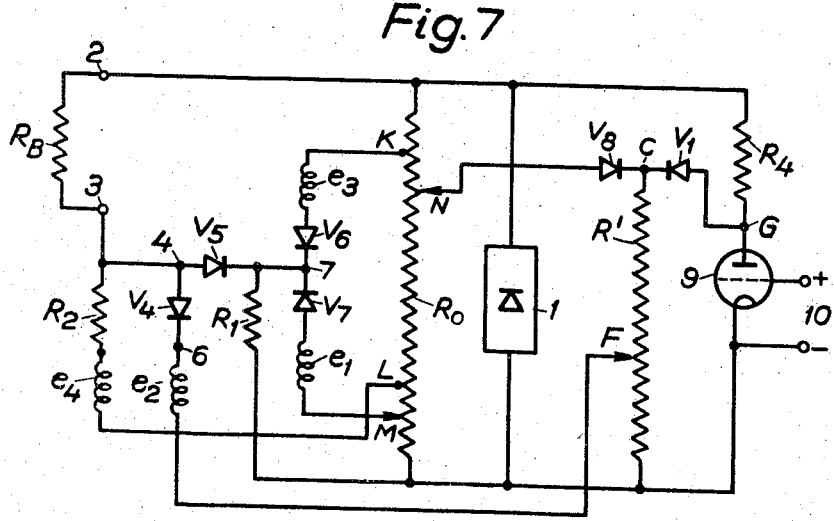
INVENTOR
LENNART BJÖRK
BY
Bailey, Stephens + Huettig United States Patent Office 3,359,481
Patented Dec. 19, 1967

3,359,481
MEANS FOR DERIVING A CONTROL FUNCTION VOLTAGE FOR CONVERTERS
Lennart Björk, Ludvika, Sweden, assignor to Allmänna Svenska Elektriska Aktiebolaget, Vasteras, Sweden, a corporation of Sweden
Filed July 23, 1964, Ser. No. 384,658
Claims priority, application Sweden, Aug. 16, 1963, 8,959/63
5 Claims. (Cl. 321—27)

ABSTRACT OF THE DISCLOSURE

Control means for a static current converter comprising means for deriving a reference A.C. control function voltage for each rectifier of the converter, said control function having an active interval of 180° el. within which it is composed of two cosinusoidal voltages with the same phase displacement and amplitude but with different neutral potential and a third A.C. voltage forming a transition voltage between said two cosinusoidal voltages within a short interval a little after the middle of said interval of 180° el.

Figure 1:
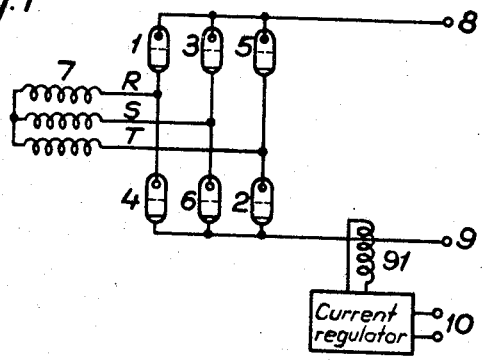

For the determination of the by-times of ignition for the different discharge paths (rectifiers) in a converter in a D.C. transmission, a variable D.C. voltage common to the different rectifiers generally is used and compared with a fixed control function voltage for each rectifier in the form of a cosinusoidal A.C. voltage derived from the corresponding commutating voltage for the proper rectifier. The time of ignition for a rectifier is for example fixed as that time when the relevant control function voltage is equal to the D.C. voltage. By varying the D.C. voltage within a range between the positive and negative amplitude values of said A.C. voltages it is possible to vary continually the time of ignition for the different rectifier paths within a range of 180 electrical degrees corresponding to a control range for the converter from maximum rectifier operation to maximum inverter operation. If however in a converter station several converter groups are arranged phase-displaced in relation to each other the commutations in one group will have a disturbing influence on the commutation voltages in the other groups which at a certain high pulse rate, particularly in inverters, is very inconvenient as described in U.S. Patent No. 2,621,319. Such disturbances appear as pulses in the voltage over an extinguishing rectifier and have a shorting effect on the margin of commutation, thereby jeopardising the deionisation of the rectifier. As is evident from said patent such voltage pulses could be eliminated with the help of so-called compensation reactors, whereby it is possible to avoid said disturbances from one converter group to another. On the other hand it is not possible to counteract in this way disturbances from one commutating group to another within the same converter, e.g. between the two commutating groups in a converter in two-way, six-pulse bridge-connection.

This may however be done according to the present invention, since the pure cosinusoidal function is replaced by a control function voltage composed of several A.C. voltages, and a means according to the invention for deriving a control function voltage is characterised in that it comprises for each rectifier three A.C. voltage sources, each of which produces from the commutation voltage of the converter an A.C. voltage, two of said A.C. voltages being cosinusoidal voltages with substantially the same phase position and amplitude but with different basic potentials, while amplitude, phase position and basic potential of the third A.C. voltage are so chosen that this A.C. voltage forms a transition voltage between the first two A.C. voltages within the range where the disturbance from the other commutating group is critical. Further the device comprises a preference connection for selecting a control function voltage composed of the two cosinusoidal voltages and the transition voltage. According to the invention the basic potential of the different A.C. voltages is fixed suitably with the help of a potentiometer fed by a D.C. voltage proportional to the amplitude of the commutation voltage.

Figure 2:
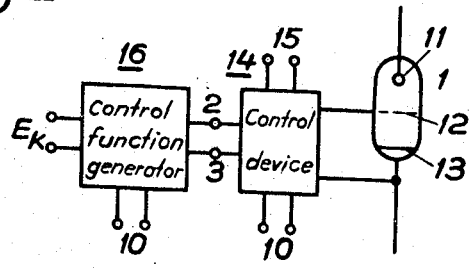
Figure 3:
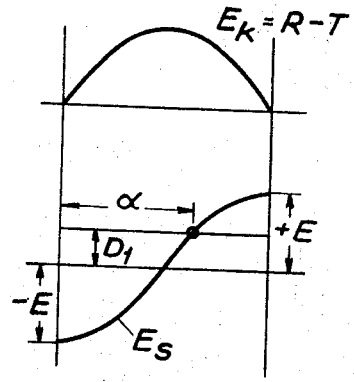
Figure 4:
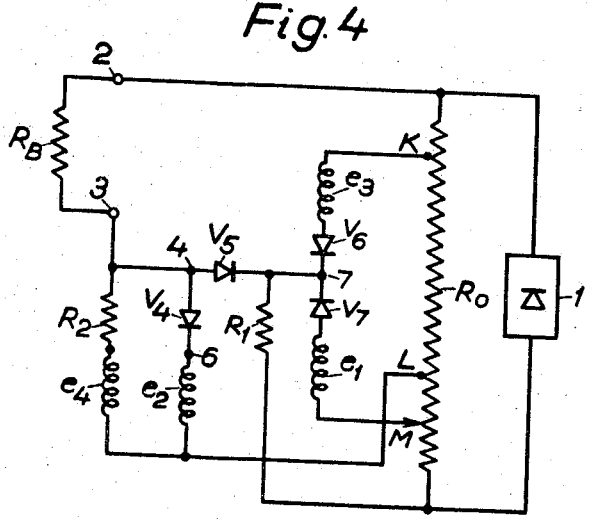
Figure 5:
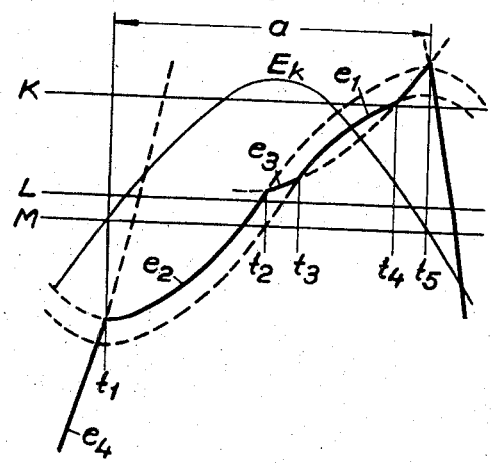
Figure 4A:
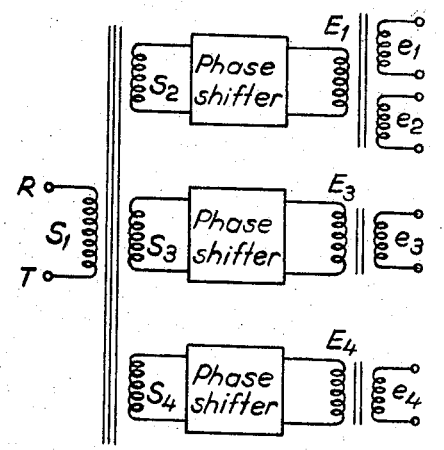

The invention is otherwise further described with reference to the accompanying drawing, where FIGURE 1 shows a two-way, six-pulse converter known per se, FIGURE 2 shows a rectifier in such a converter, FIGURE 3 shows the ratio between commutating voltage and control function voltage, and FIGURE 4 and 4a show a device according to the invention, while FIGURE 5 shows the curve shape of a control function voltage derived according to the invention. FIGURE 6 gives a picture of the disturbances in the form of voltage pulses in the voltage over a rectifier originating from another commutation group, while FIGURE 7 shows a further development of the invention with the help of which it is possible upon certain regulator interference to transfer from the combined control function voltage to a purely cosinusoidal-shaped voltage.

FIGURE 1 shows a two-way 6-pulse converter of a kind known per se comprising six rectifiers 1–6 and a converter transformer, of which only the secondary winding 7 has been shown. The D.C. terminals of the converter are indicated by the terminals 8, 9. In one of the D.C. conductors a transductor 91 is inserted, connected to a current regulator of a kind known per se with output terminals 10. In FIGURE 2 is shown one one of the rectifiers 1 provided with anode 11, control grid 12 and cathode 13. Between grid and cathode a control device 14 is connected, this also being of conventional type. The working principle for such a control device is evident from FIGURE 3, where the curve $E_k$ indicates the commutation voltage for the rectifier 1, i.e. the difference between the phase voltages R and T which are the commutation voltages for the rectifier 1 and the previous rectifier in the phase, namely the rectifier 5, upon the assumption that the ignition sequence for the different rectifiers in the converter according to FIGURE 1 corresponds to the reference figures for these. The control device 14 is supplied partly across the terminals 15 with a variable D.C. voltage $D_1$ as indicated in FIGURE 3, partly with the commutation voltage $E_k$ which is suitably supplied by a device 16 for deriving a suitable control function voltage. If the commutation voltage $E_k$ is interpreted as a sinusoidal voltage, it is known to derive from this a control function voltage $E_s$ in the form of a cosinusoidal voltage such as is indicated in FIGURE 3. In the control device 14 the control function voltage $E_s$ is compared with the D.C. voltage $D_1$ and the intersectional point between the two voltages is used to indicate the ignition time for the rectifier 1. By varying the D.C. voltage $D_1$ between the values $-E$ and $+E$, i.e. the positive and negative amplitude values of the commutation voltage, it can be seen that it is possible to vary the control angle $\alpha$ of the rectifier from zero to 180°. For the converter this means a control range from maximum rectifying to maximum inverting operation.

The two rectifier groups 1, 3, 5 and 2, 4, 6 respectively form two separate commutating groups and as mentioned earlier the commutations in one group will have an influence on the commutation voltages in the other group, so that the latter will be deformed within certain ranges.

Such disturbances make continual control according to the lower curves in FIGURE 3 impossible, which may be very troublesome. In order to avoid this the device 16 for deriving the control function voltage $E_s$ according to this invention may be made as shown on FIGURE 4.

FIGURE 4 shows a rectifier 1, the output voltage D of which is proportional to the commutation voltage. This is done most simply by feeding the rectifier D directly from the commutation voltage $R-T$. The voltage D is fed to a resistance $R_0$. Further, the figure shows four A.C. voltage sources $e_1-e_4$, each of which generates an A.C. voltage derived from the commutation voltage. Each voltage source consists suitably of a transformer fed from the commutating voltage and a phase shifting device as will be further described with reference to FIGURE 4a.

In FIGURE 4a is shown a transformer S fed from the commutation voltage $Ek=R-T$ which is active at ignition of the rectifier 1 in FIGURES 1 and 2. The transformer S has a primary winding $S_1$ and three secondary windings $S_2$, $S_3$ and $S_4$. The winding $S_2$ is connected through a phase shifter to another transformer $E_1$ with two secondary windings $e_1$ and $e_2$. These two windings are shown in FIGURE 4 as the A.C. voltage sources $e_1$ and $e_2$. When the commutation voltage $E_k$ is regarded as a sinusoidal voltage the voltages $e_1$ and $e_2$ can be regarded as cosinusoidal when they are shifted 90° in phase in relation to the voltage $E_k$. As the voltages $e_1$ and $e_2$ shall have the same phase positions they can be taken from the common transformer $E_1$.

The transformer winding $S_3$ is connected through another phase shifter to the transformer $E_3$ the secondary winding $e_3$ of which forms the A.C. voltage source $e_3$ in FIGURE 4. From FIGURE 5 it will be seen that $e_3$ is nearly opposite in phase to the commutation voltage $E_k$. In the same way the transformer winding $S_4$ is connected through a third phase shifter to the transformer $E_4$ the secondary winding $e_4$ of which forms the A.C. voltage source $e_4$ in FIGURE 4. From FIGURE 5 it will be seen that $e_4$ is nearly in phase with the commutation voltage $E_k$.

The basic potential of said A.C. voltage sources is fixed by connecting these A.C. voltage sources to the resistance $R_0$ at the points K, L and M. The voltages derived by the voltage sources $e_1$ and $e_2$ are cosinusoidal voltages with substantially the same phase position and amplitude. The desired voltage for each time is chosen with the help of the diodes $V_4-V_7$ and resistances $R_1$ and $R_2$ and is taken out over the terminals 2, 3 and a loading resistance $R_B$ connected thereto, which is at least one order of magnitude higher than the resistances $R_1$ and $R_2$. The necessary transition voltage between $e_1$ and $e_2$ comes from the voltage source $e_3$. The control function voltage taken out from the terminals 2, 3 will as mentioned previously be compared with the control voltage of the converter, which is a variable D.C. voltage which may be varied within the range between the positive and negative amplitudes of the control function voltage. The device according to FIGURE 4 is thus connected to the control device 14 over the terminals 2, 3 as indicated in FIGURE 2. In order to ensure correct commutation even in cases where the variable D.C. voltage assumes values in excess of the amplitude values of the control function voltage, the active half-periods of the control function voltage are suitably limited with the help of a limit voltage. The voltage source $e_4$ shown in the figure is intended to generate such a limit voltage.

The voltages $e_1-e_4$ derived according to FIGURE 4 are illustrated in FIGURE 5. They are as mentioned pure sinusoidal or cosinusoidal voltages with different basic potentials. These basic potentials are illustrated with the help of the lines K, L and M, where the line K indicates the basic potential for $e_3$, while L indicates the basic potential for $e_2$ and $e_4$ and M the basic potential for $e_1$. In FIGURE 5 the commutation voltage $E_k$ is also illustrated. The half-period in question of the control function voltage is that which corresponds to the indicated half-period $a$ of the commutation voltage $E_k$.

It is seen from FIGURE 4 that the potential at the point 2 is equal to the D.C. voltage in the upper end of the resistance R. The potential at the point 3 is determined by the potential at the point 4, which is chosen with the help of the diodes $V_4$ and $V_5$ and the resistance $R_2$. The potential at point 7 is determined as the highest of the potentials from the voltage sources $e_1$ and $e_3$.

From FIGURE 5 it is evident that before the time $t_1$ the voltage $e_4$ is the lowest of all voltages. Before this time the rectifiers $V_4$ and $V_5$ will be blocked and the voltage at the points 3 and 4 will be determined by the voltage $e_4$. After the time $t_1$ the voltage at point 4 is determined by the voltage at point 6. At this time the voltage at point 7 is determined by the voltage $e_3$ which is higher than the voltage $e_1$. As a result of this the voltage at point 7 which is higher than the voltage at point 6 will block the diode $V_5$, while the diode $V_4$ will be conducting. Consequently after the time $t_1$ the voltage at the points 3 and 4 will correspond to the voltage indicated by the voltage source $e_2$, which will exceed the voltage $e_4$ at the upper end of the resistance $R_2$. At the time $t_2$ the voltage $e_2$ will exceed the voltage $e_3$, which means that the potential at point 7 is less than the potential at point 6. The diode $V_4$ is blocked and the diode $V_5$ is conducting and the voltage at the points 3 and 4 is determined by the voltage $e_3$, which is diverted across the resistance $R_1$ to the lower end of the resistance $R_0$. At the time $t_3$ the voltage $e_1$ will exceed the voltage $e_3$, the diode $V_7$ being thereby conducting and the diode $V_6$ blocked. Thereafter the voltage $e_1$ is determining for the voltage at the points 3 and 4 until the time $t_4$ when the voltage $e_3$ will again exceed the voltage $e_1$. The voltage $e_3$ will thereafter be determining for the output voltage to the time $t_5$ when the voltage $e_4$ is lower than $e_3$ and therefore will determine the output voltage. The voltage $e_4$ will hereafter be predominant during the half-period until at the time $t_1$ the voltage $e_2$ takes over the control. The resulting voltage is shown with a thick line in FIGURE 5.

On closer survey of FIGURE 5 it is seen that the time $t_1-t_2$ substantially corresponds to the range for rectifying, in which range the control function voltage is purely cosinusoidal. The range from $t_2$ to $t_5$ corresponds on the other and to inverting and the control function voltage here is composed of the cosinusoidal voltage $e_1$ and the voltage $e_3$. By allowing the controlling D.C. voltage to vary between the negative amplitude value for the voltage $e_2$ and the positive amplitude value for the voltage $e_1$ a control range is obtained of nearly 180°, and the upper active part of the voltage $e_3$ will then function as a limit voltage at this end in order to ensure commutation even at the highest occurring positive values of the control voltage.

In order to understand better the reason for the lower active part of the voltage $e_3$, i.e. the part which lies in the time from $t_2$ to $t_3$, FIGURE 6 is referred to which gives the voltage over a rectifier before, during and after a commutation. The initiation of the commutation is indicated by an arrow at the time $t'_1$. The curves $a$, $b$, $c$ in FIGURE 6 correspond to the curves in FIGURE 5–FIGURE 7 in the above mentioned U.S. Patent No. 2,621,319. The voltage over a rectifier may be regarded as zero during the whole conducting interval of the rectifier and also during the commutating interval, which is stated as $t'_1-t'_2$. When the commutation is completed the voltage falls to a negative value. During the time $t'_2-t'_3$, the so-called margin of commutation, the voltage is negative and at the time $t'_3$ the voltage will be positive as indicated in FIGURE 6a. During the time $t'_3-t'_4$ the disturbance coming from a subsequent commutation in another commutation group within the same converter occurs in the form of a voltage pulse. The intention of the present invention is to avoid difficulties from these disturbances. At higher current and/or lower voltage it is normal that the commutation is initiated earlier as indicates according to FIGURE 6b. At the same time however the commutating will be initiated earlier also in the disturbing commutation group, and therefore the margin of commutating is restricted from $\gamma_1$ to $\gamma_0$. An even earlier initiation of the commutation gives a certain extension of the margin of commutation, but not until the ignition is initiated as early as indicated in FIGURE 6c is it possible to attain the desired margin of commutation, here stated with the expression $\gamma_2$. The change in control angle indicated in FIGURE 6c is considerably greater than that which corresponds to the change in the current and voltage of the converter. It is therefore seen that within the range where the disturbances from another commutation group in the same converter are active, a more rapid changing of the control angle than normal would be desirable. Such a more rapid changing in the control within a certain range is obtained according to the present invention as is evident from FIGURE 5, where the voltage $e_3$ within the range $t_2$–$t_3$ has considerably less inclination than the voltages $e_2$ and $e_1$ outside this area. By suitable choice of basic potential and phase position of the voltage $e_3$ this voltage will be active in the range where the described disturbances are critical. A certain change of the controlling D.C. voltage will then, as seen within this range, give a considerably greater change in the control angle than is the case outside this range.

In the above description the conditions have been dealt with during so-called programme controlling, i.e. when the converter is controlled according to a certain programme, which during inverter operation means that the converter is controlled with a certain desired margin of commutation, for example a constant margin of commutation. During programme controlling of an inverter station the direct current of the D.C. transmission is determined by the rectifier station and the current regulator present in the inverter station is inactive and its output voltage is zero. If the voltage ratio in the transmission changes in such a way that the rectifier station is unable to deliver the desired current, the current regulator of the inverter station will be engaged and lower the EMF of the station by changing the control angle in the direction of earlier ignition of the rectifiers. It is this current regulator which is indicated in FIGURE 1 and which by the terminals 10 is connected to the control device 14 in FIGURE 2.

In order under these conditions to ensure the stability of the converter within the range $t_2$–$t_3$ in FIGURE 5, the derivative of $e_3$ within this range should not be too small. This limits to some degree the freedom of choice of $e_3$. When it is simultaneously taken into consideration that, under current regulator control, the control of the margin of commutation is inactive, it would be desirable in this case to be able completely to avoid the influence of the voltage $e_3$.

This can be attained by means of the embodiment shown in FIGURE 7 of a device according to the invention. The left part of this figure corresponds substantially to FIGURE 4. The output terminals are as earlier mentioned 2 and 3 and the terminal 2 is connected to the upper end of the potentiometer resistance $R_0$. The basic potential of the voltage source $e_2$ is however in this case fixed with the help of a resistance $R'$ arranged parallel with a part of the resistance $R_0$. The connection points M, N and F are then so arranged that, considering only the resistances $R_0$ and $R'$, the points F and M will have equal potentials. The uppermost point C of the resistance $R'$ is as shown connected on the one hand across the diode $V_8$ to the point N on the potentiometer $R_0$, and on the other hand across the diode $V_1$, and a resistance $R_4$ to the upper end point on the potentiometer $R_0$. The anode on an electron tube 9 is connected to a point G between the resistance $R_4$ and the rectifier $V_1$. The control circuit for this tube is connected over terminals 10 to the current regulator of the converter (compare FIGURES 1 and 2). From the figure it is evident that the point C has the same potential as the highest of the potentials in the points N and G. As long as the electron tube 9 is blocked the point G will have the same potential as the upper end of the potentiometer R and the basic potential of the voltage $e_2$ is higher than the basic potential of the voltage $e_1$ in the same way as according to FIGURES 4 and 5. At positive grid potential on the electron tube 9 the point G will have a lower potential than the point N. This means that the diode $V_1$ is blocked and the points M and F have the same potential, which means that the voltages $e_1$ and $e_2$ have the same basic potential. On looking at the diagram in FIGURE 5 it shows that the voltage curve $e_2$ approaches the voltage curve $e_1$ and the range $t_2$–$t_3$ approaches zero.

If therefore the grid voltage connected to the terminals 10 for the tube 9 is so arranged that it is positive when the current regulator controls the converter against earlier commutation and thereby takes over the control of the converter, it is seen that such a regulator engagement causes the influence of the voltage source $e_3$ in the time $t_2$–$t_3$ to disappear completely, so that the control function voltage is a purely cosinusoidal voltage within the whole control range, which from a stability viewpoint is a great advantage. The mentioned disturbances from other commutations within the same six-pulse group occur as mentioned mainly when the converter in inverter operation works with a certain given margin of commutation. It is in this case that a control function voltage according to FIGURE 5 is required. If the converter goes over to a condition of being current controlled, the commutation intervals will be so far away from the critical range that the disturbances will be inactive, and therefore a purely cosinusoidal control function voltage such as that obtained according to FIGURE 7 is preferred.

It is evident that the electron tube 9 may be replaced by a relay, which may sometimes be an advantage since such a relay is often present, so that the electron tube 9 is quite simply replaced by a contact on an existent relay.

An even simpler construction may be obtained if in FIGURE 4 said contact is connected between the points L and M and thereby short-circuits a certain part of the resistance $R_0$. A condition for this is that the change caused thereby in the potential distribution in the resistance $R_0$ is permissible.

I claim:

1. In a static current converter comprising a plurality of rectifiers arranged in at least two commutating groups, means for deriving a control function voltage for each of the rectifiers of said converters, said means comprising for each rectifier first, second and third A.C. voltage sources, means to feed said A.C. voltage sources from the commutation voltage for such rectifier, that is, the difference between the anode voltages of a particular rectifier and the preceding rectifier of the same commutation group; said feeding means comprising transformers and phase shifting means, said commutation voltage being substantially a sinusoidal voltage, said feeding means for the first and second of said A.C. voltage sources including means to transform said commutation voltage into cosinusoidal voltages having the same phase displacement and amplitude but different base potentials, the third A.C. voltage having such amplitude, phase displacement and base potential as to form a transition voltage between said first and second cosinusoidal voltages within a certain field of half a period of said control function voltage, at least one D.C. voltage source for deriving D.C. base potentials for said three A.C. voltage sources, a potentiometer, said D.C. voltage being connected to said potentiometer, each of said A.C. voltage sources having one terminal connected to a corresponding tap on said potentiometer, a connection between said A.C. voltage sources and the output terminals of said means comprising rectifiers between said A.C. voltage sources and said output terminals.

2. Means according to claim 1, a potentiometer fed from said D.C. voltage source, said D.C. voltage source being proportional to the amplitude of said commutation voltage, the base potentials of said A.C. voltage sources being taken off from different taps of said potentiometer.

3. Means according to claim 1, a further A.C. voltage source for supplying a limit voltage for half a period of said control function voltage, said further A.C. voltage source being fed from said commutation voltage through a transformer and phase shifting means, one terminal of said A.C. voltage source being connected to a tap on said potentiometer, the other terminal of said A.C. voltage source being connected to an output terminal of said means through a rectifier.

4. Means according to claim 1 switching means for eliminating the difference between the base potentials of said first and second cosinusoidal voltages, said switching means being responsive to a current regulator of said current converter.

5. Means according to claim 4, two potentiometers, one for each of said first and second A.C. voltages, the base potentials of said first and second cosinusoidal voltages being each taken off from a tap on its own potentiometer said two potentiometers being fed from said D.C. voltage source, said switching means equalising the potential difference between said taps.

References Cited

UNITED STATES PATENTS

| | | | |
|---|---|---|---|
| 2,246,181 | 6/1941 | Morton | 321—27 X |
| 2,568,334 | 9/1951 | Petterson | 315—350 X |
| 3,226,627 | 12/1965 | Fromkin | 323—22 |

JOHN F. COUCH, *Primary Examiner.*

G. GOLDBERG, *Assistant Examiner.*